Nov. 27, 1928.
R. W. STEM
FRICTION DRIVE
Filed Sept. 18, 1924
1,692,909
2 Sheets-Sheet 1
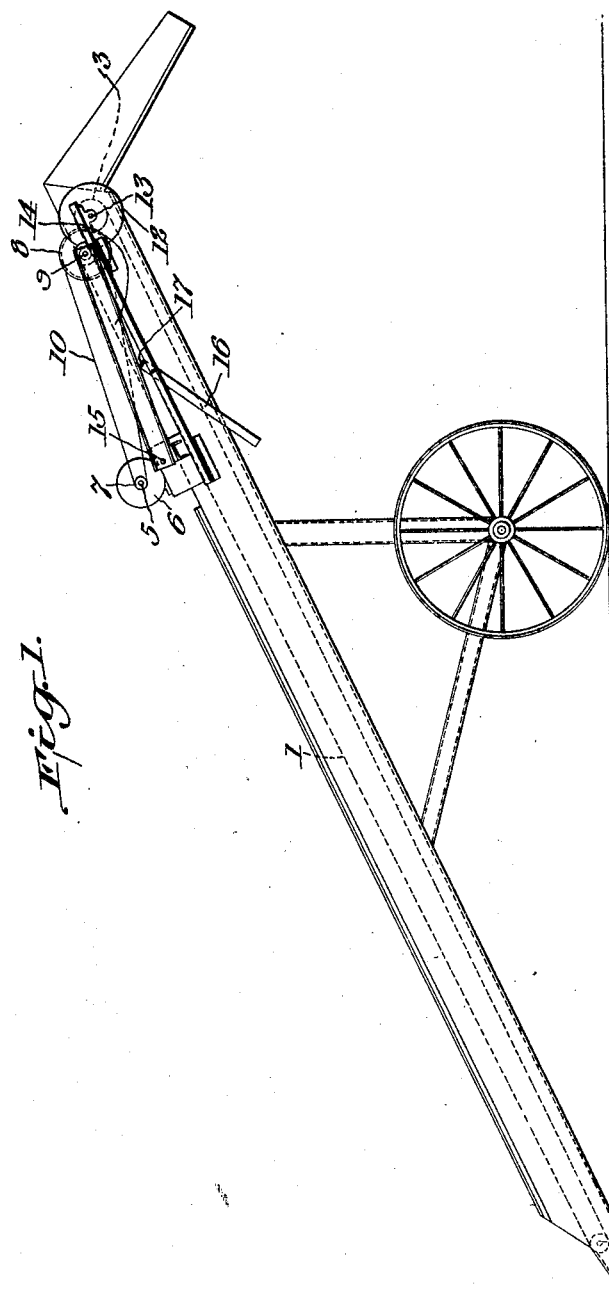

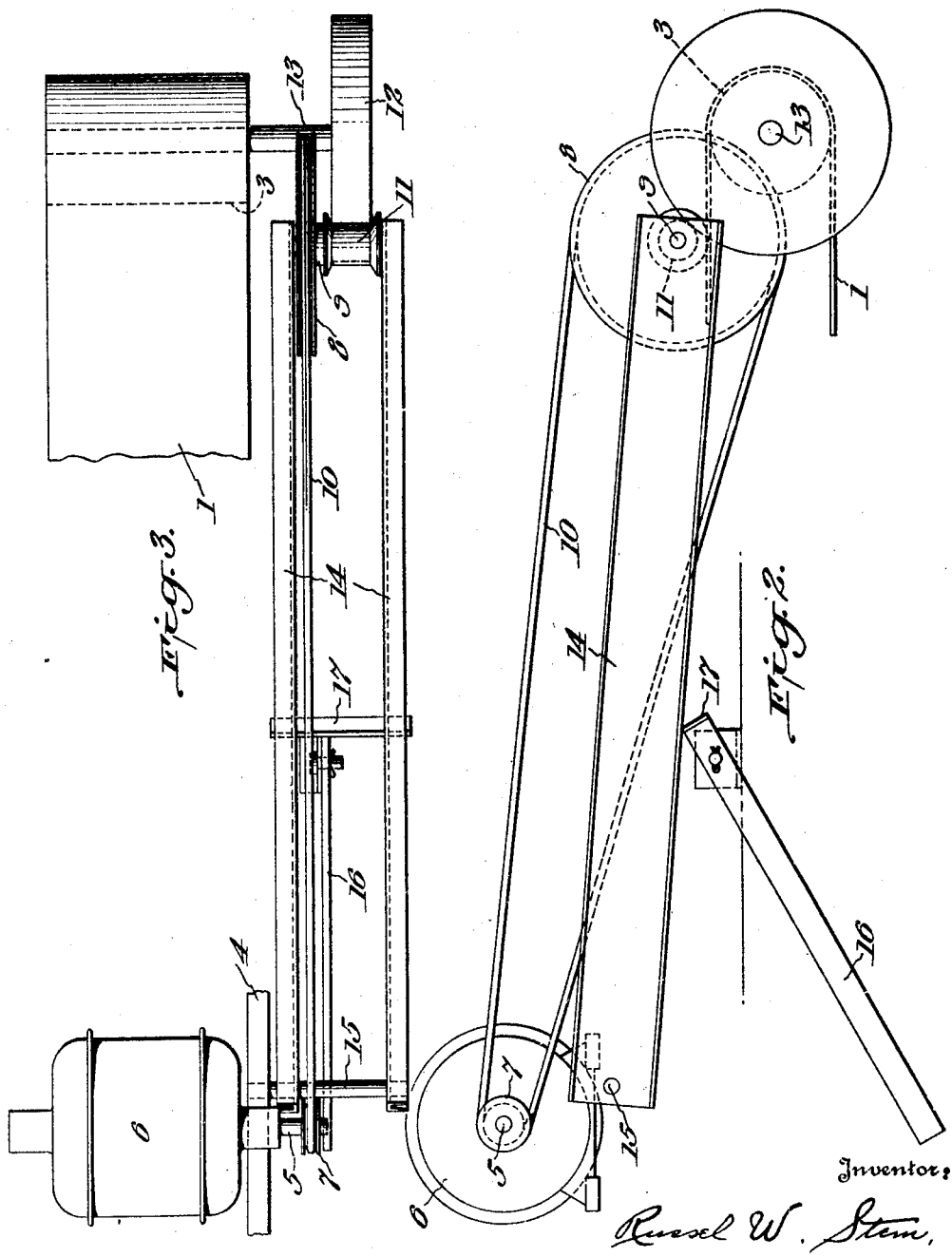

Patented Nov. 27, 1928.

1,692,909

UNITED STATES PATENT OFFICE.

RUSSEL W. STEM, OF ALLENTOWN, PENNSYLVANIA.

FRICTION DRIVE.

Application filed September 18, 1924. Serial No. 738,468.

This invention relates to a friction drive and particularly to a friction drive in which the frictional engagement of the parts is automatically regulated in accordance with the load to be moved.

An object of the invention is to provide a friction drive of simple and substantial construction, and one in which the mechanism is automatically adjusted in accordance with the load. A further object of the invention is to provide an automatically regulated friction drive of the type stated which may be readily thrown into and out of operation.

These and other objects of my invention will be apparent from the following specification when taken in connection with the accompanying drawings, in which—

Fig. 1 is a side elevation of a portable belt conveyor in which is embodied the novel friction drive, and Figs. 2 and 3 are, respectively, a side elevation and a plan view of the friction drive.

In the drawings which illustrate the invention as applied to a conveyor, the conveyor belt is designated by the numeral 1 and passes over an idler roller 2 and a driven roller 3, which rollers are carried by a suitable supporting frame 4. As the friction drive is of general applicability, further description of the conveyor structure is deemed unnecessary.

Power for operating the roller 3 is furnished from a suitable power shaft 5, here shown as the armature shaft of a motor 6, upon which shaft is fixed a pulley 7 which drives a pulley 8 upon an intermediate shaft 9 by means of a belt 10. The intermediate shaft 9 also carries a driving wheel 11 which is engageable with a driven wheel 12 on the driven shaft 13 to which the roller 3 is fixed. The power shaft 5 and driven shaft 13 are fixed with respect to each other, while the intermediate shaft 9 is carried by links 14 which are pivotally supported at a point adjacent the power shaft 5.

The location of the pivot point 15 of the links 14 is an important feature of my invention. When the pivot 15 is properly located the frictional engagement between the wheels 11, 12 and the tension on the belt 10 will increase with the load to be moved by the rotation of shaft 13. As here shown, the drive wheel 11 comes into contact with the face of wheel 12 which is directed towards the shaft 5 and at a point or line located at one side of a line drawn from the shaft 5 to the shaft 13. With this arrangement of friction wheels, the pivot 15 is located at the opposite side of a line through shafts 5 and 13, and the distance between pivot 15 and shaft 9 is but slightly less than the distance from shaft 5 to shaft 9.

A lever 16 which is pivoted to the frame 4 and carries a bar 17 located adjacent the links 14 serves to move the drive wheel 11 into and out of engagement with the driven wheel 12.

The operation is as follows: Assuming that the motor 6 is running and the lever 16 is shifted to bring the friction wheels into contact, the rotation of the drive wheel 11 will tend to rotate the wheel 12 in a clockwise direction. When a heavy load is applied to shaft 13, and the shaft 13 and wheel 12 do not rotate freely, the wheel 11 will travel bodily with respect to wheel 12, and in counterclockwise direction. As the initial or "no-load" line of engagement between the friction wheels 11 and 12 is displaced from the line of centers of the shafts 5 and 13, and the pivotal support of the intermediate shaft 9 is so positioned that the movement of wheel 11 about the wheel 12 shifts the shaft 9 along a path which lies outside of an arc struck from the shaft 5 with a radius equal to the normal or no-load spacing of shafts 5 and 9, the distance between shafts 5 and 9 increases while the distance between shafts 9 and 13 decreases. The result therefore of the movement of shaft 9 about pivot 15 is to increase the frictional contact between the wheels 11 and 12, and to increase the tension in the drive belt 10. Unless the load to be moved is sufficient to stall the motor 6, the movement of the shaft 9 continues until the frictional engagement between the wheels reaches such a point that the wheel 12 will be rotated by the wheel 11. The parts may be so proportioned that the motor will stall before shaft 9 passes the center line of shafts 5 and 13, or a suitable stop may be provided to limit the movement of the intermediate shaft, or the length of link 14 may be made adjustable so that shaft 9 may pass the center lines of shafts 5 and 13 whenever the load exceeds a predetermined amount.

While the particular arrangement which I have illustrated is very desirable since the weight of the intermediate shaft and the supporting links moves the driving wheel into contact with the driven wheel when the support of the clutch arm is removed from the links, it is obvious that the invention is not limited to this specific embodiment of the invention. If desired the drive wheel 11 may engage the lower face of the wheel 12, but in this case a spring or other yielding means must be provided to urge the drive wheel into engagement with the driven wheel. Similarly the shafts may be arranged in vertical planes, or at any desired angle. It will also be apparent that the position of the pivot point 15 may be widely varied, so long as its location is such that the movement of the shaft 9 as the driving wheel moves bodily over the driven wheel decreases the distance between the intermediate and the driven shaft and at the same time increases the distance between the intermediate and power shafts.

I claim:—

1. A friction drive of the type comprising a power shaft, a driven shaft, an intermediate shaft bodily movable with respect to said shafts, a belt drive between said power and intermediate shafts, and cooperating friction wheels on said intermediate and driven shafts, characterized by the fact that the no-load line of engagement between said friction wheels is spaced from and adjacent to the line of centers of said power and driven shafts, and the means supporting said intermediate shaft comprises a link carrying said intermediate shaft and pivotally mounted on an axis so spaced from said line of contact that the pivotal mounting of the link permits movement of said intermediate shaft as the load on the driven shaft increases toward said line of centers and along a path which lies outside of an arc struck from the center of the power shaft with a radius equal to the no-load spacing of the power and intermediate shafts.

2. In a friction drive, a power shaft, a driven shaft, an intermediate shaft, a belt drive between said power and intermediate shafts, friction wheels on said intermediate and driven shafts, a link having means at one end thereof for supporting said intermediate shaft, and a pivotal support for the opposite end of said link, said pivotal support being positioned at one side of a line joining said power and driven shafts and said link being of such length that said intermediate shaft lies on the opposite side of said line when said friction wheels come into engagement with normal load, and passes the said line when a predetermined degree of overload acts.

3. In a friction drive, a power shaft, a driven shaft, an intermediate shaft, a belt drive between said power and intermediate shafts, friction wheels on said intermediate and driven shafts, means supporting said power and driven shafts in fixed position with respect to each other, a link carrying said intermediate shaft, a pivotal support for said link, said pivotal support being so positioned that movement of the driving friction wheel about the driven friction wheel increases the distance between the power and intermediate shafts and simultaneously decreases the distance between the intermediate and driven shafts, and means for moving said link to carry said friction wheels out of engagement.

In testimony whereof, I affix my signature.

RUSSEL W. STEM.